US006575509B1

United States Patent
Golden

(10) Patent No.: US 6,575,509 B1
(45) Date of Patent: Jun. 10, 2003

(54) EXTENDABLE BUMPER FOR EXTERNAL VEHICLE TRANSPORTATION AND STORAGE

(75) Inventor: Mark A. Golden, Washington, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/108,091

(22) Filed: Mar. 27, 2002

(51) Int. Cl.⁷ .............................................. B60R 19/02
(52) U.S. Cl. ...................... 293/119; 293/106; 296/37.1; 296/26.09
(58) Field of Search ................................. 293/119, 118, 293/106; 296/26.1, 37.1, 26.08, 26.09, 26.11

(56) References Cited

U.S. PATENT DOCUMENTS

| 3,608,943 | A | * | 9/1971 | Gostomski |
| 3,838,868 | A |   | 10/1974 | Robertson ..................... 280/34 |
| 3,947,061 | A | * | 3/1976 | Ellis |
| 5,135,274 | A |   | 8/1992 | Dodd .......................... 293/117 |
| 6,059,330 | A | * | 5/2000 | Moffett et al. ............... 293/118 |
| 2002/0105201 | A1 | * | 8/2002 | Melotik et al. ........... 296/26.09 |

FOREIGN PATENT DOCUMENTS

JP  1-282040  * 1/1989

* cited by examiner

Primary Examiner—Joseph D. Pape
(74) Attorney, Agent, or Firm—Kathryn A. Marra

(57) ABSTRACT

An extendable vehicle bumper for external transportation and storage of objects. A horizontal platform is mounted to the underside of a vehicle frame and is attached at one end to the vehicle bumper. The platform is extendable on a horizontal plane between an open position and a closed position. In the closed position, the platform is supported in a horizontal plane within the vehicle framework on the underside of the rear end of the vehicle. The vehicle bumper serves to access the platform by providing a handle for extending the platform outwardly from the vehicle frame. When the platform is in the open position, the platform extends beyond the vehicle profile and is generally in rigid relation with the vehicle. The horizontal platform is extendable between the open and closed position by support arms fixed to the platform opposite the vehicle bumper.

20 Claims, 5 Drawing Sheets

EXTENDABLE BUMPER FOR EXTERNAL VEHICLE TRANSPORTATION AND STORAGE

TECHNICAL FIELD

The present invention relates to an extendable bumper on a vehicle for transporting or storing objects external of the vehicle.

BACKGROUND OF THE INVENTION

Additional space for carrying objects and big loads is often required by a vehicle owner for several reasons—the objects do not fit into a conventional automobile trunk, the objects are awkwardly shaped, the interior space is needed for passengers, or that the objects themselves are not desirable interior cargo. A variety of cargo carriers are available for exterior vehicle installation. Open and closed trailers may be attached to an exterior trailer hitch and come in a variety of forms and sizes. Recently, exterior steel cargo carriers have become popular. These carriers are generally formed of a steel platform and have a tongue for attachment to an exterior receiver hitch, or trailer hitch.

It would therefore be desirable to provide an assembly that enables enhanced load carrying capability in an automotive vehicle, but that avoids the need for trailers or other such structures.

SUMMARY OF THE INVENTION

The present invention meets this need by providing an extendable vehicle bumper for external transportation and storage of objects. A horizontal platform is mounted to the underside of a vehicle frame and is attached at one end to the vehicle bumper. The platform is extendable on a horizontal plane between an open position and a closed position by extending support arms. In the closed position, the platform is supported in a horizontal plane within the vehicle framework on the underside of the rear end of the vehicle. Alternatively, the platform, support arms and any portion of the vehicle frame may be enclosed in a pan-like structure to provide additional environmental protection to the mechanical and electrical parts forming the horizontal platform.

The vehicle bumper serves to access the platform by providing a handle for extending the platform outwardly from the vehicle frame. When the platform is in the open position, the platform extends beyond the vehicle profile and is generally in rigid relation with the vehicle, thereby providing external storage space for any number of objects. The bumper preferably is formed to help resist deformation when the platform is in any position and more particularly when the platform is in an extended or open position.

These and other objects of the present invention will become apparent upon reading the following detailed description in combination with the accompanying drawings, which depict systems and components that can be used alone or in combination with each other in accordance with the present invention.

DESCRIPTION OF THE PREFERRED EMBODIMENT

Figure 1:
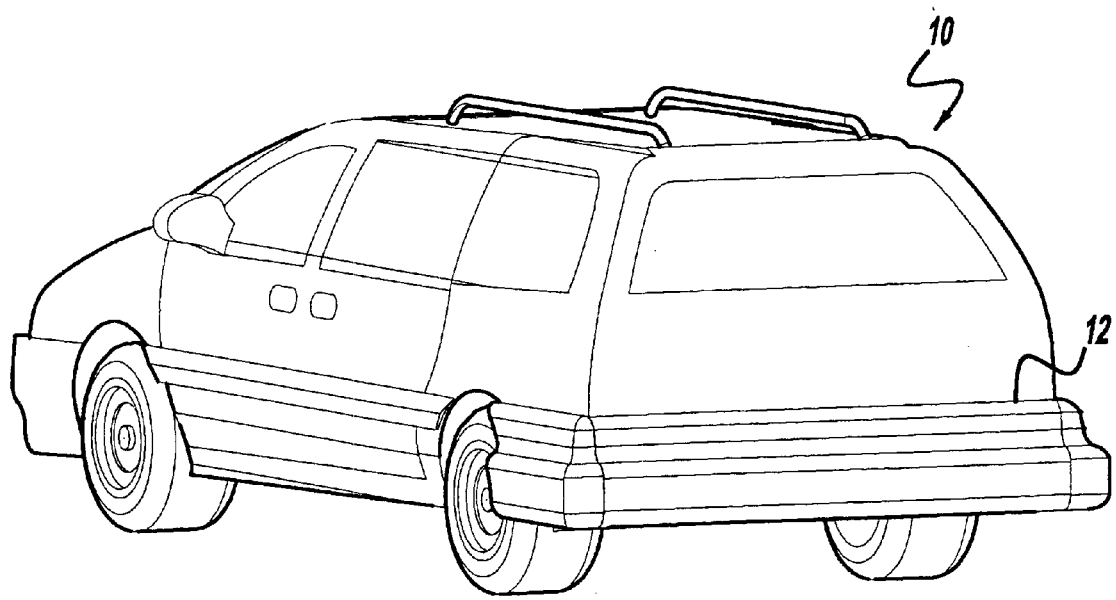
FIG. 1 illustrates a perspective view of an automotive vehicle with an extendable vehicle bumper of the present invention in a closed position.
Figure 2:
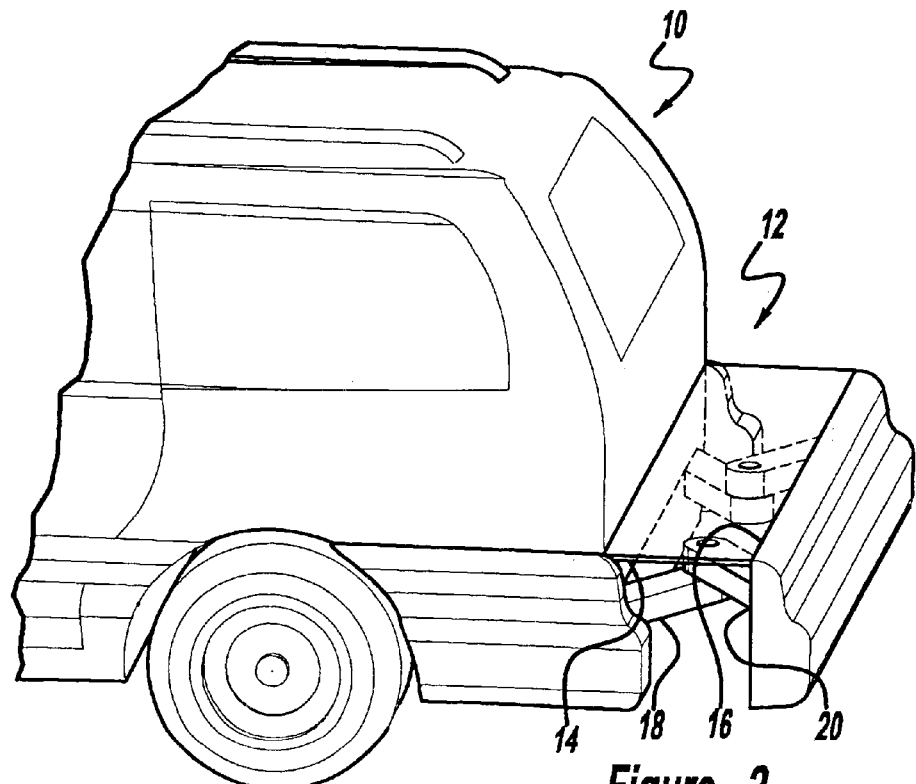
FIG. 2 illustrates a partial plan view of the extendable vehicle bumper of the present invention in a partially opened position with scissors support arms.
Figure 3:
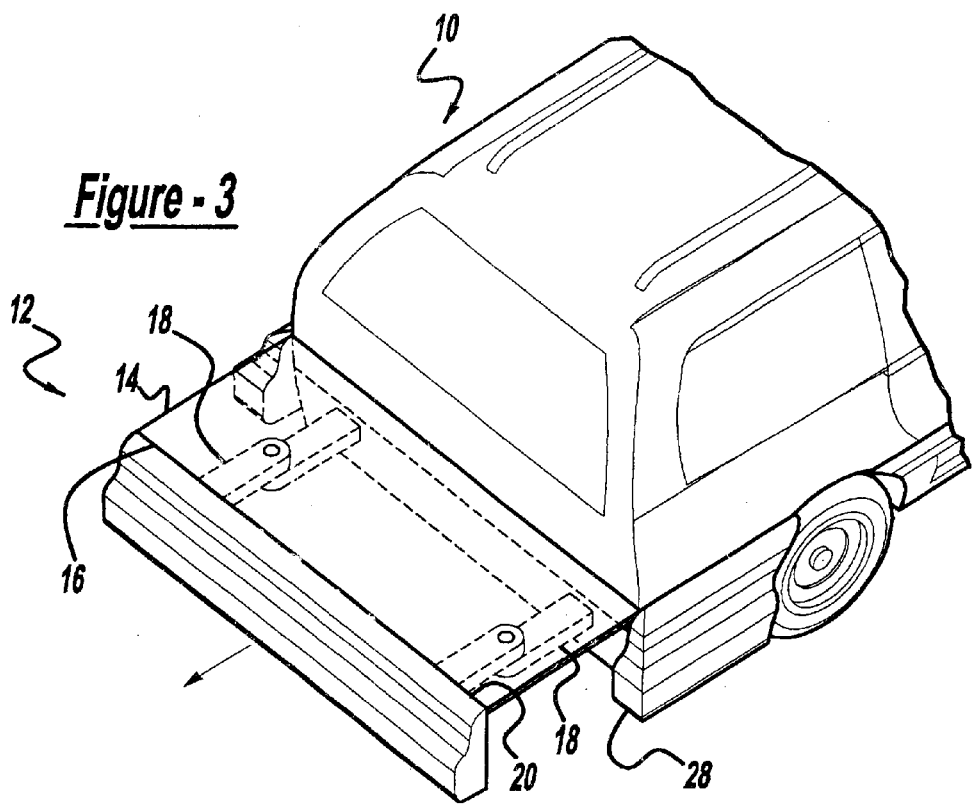
FIG. 3 illustrates a partial plan view of the extendable vehicle bumper of the present invention in a fully opened position with scissors support arms fully extended.
Figure 6:
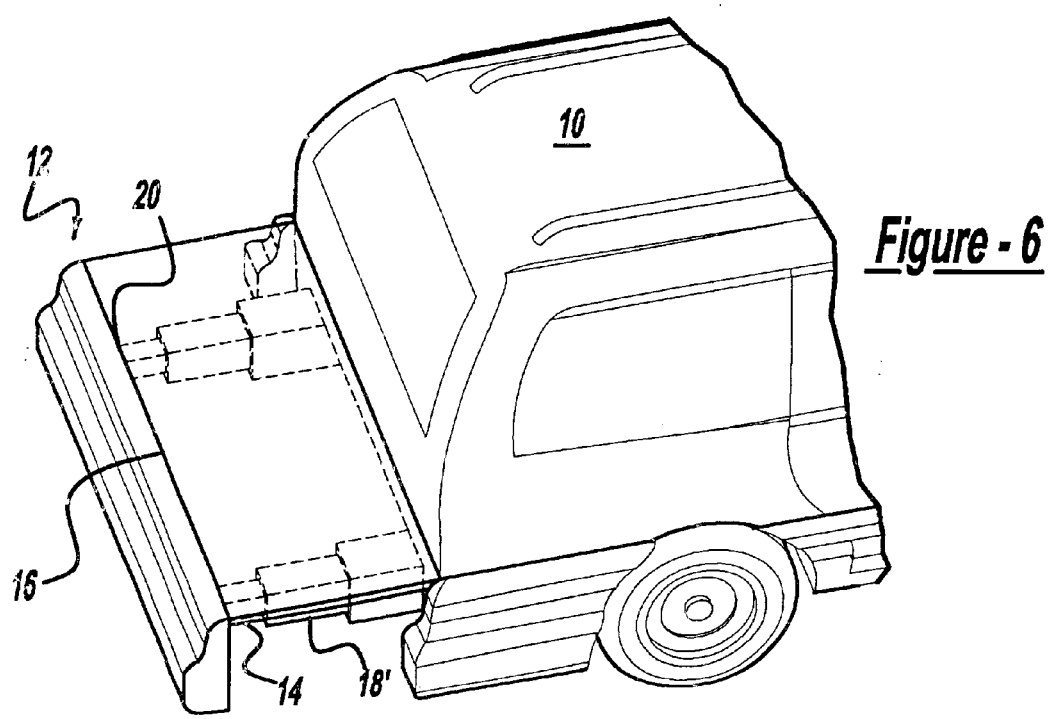
FIG. 6 illustrates a partial plan view of the extendable vehicle bumper of the present invention in a fully opened position with telescoping support arms.
Figure 7:
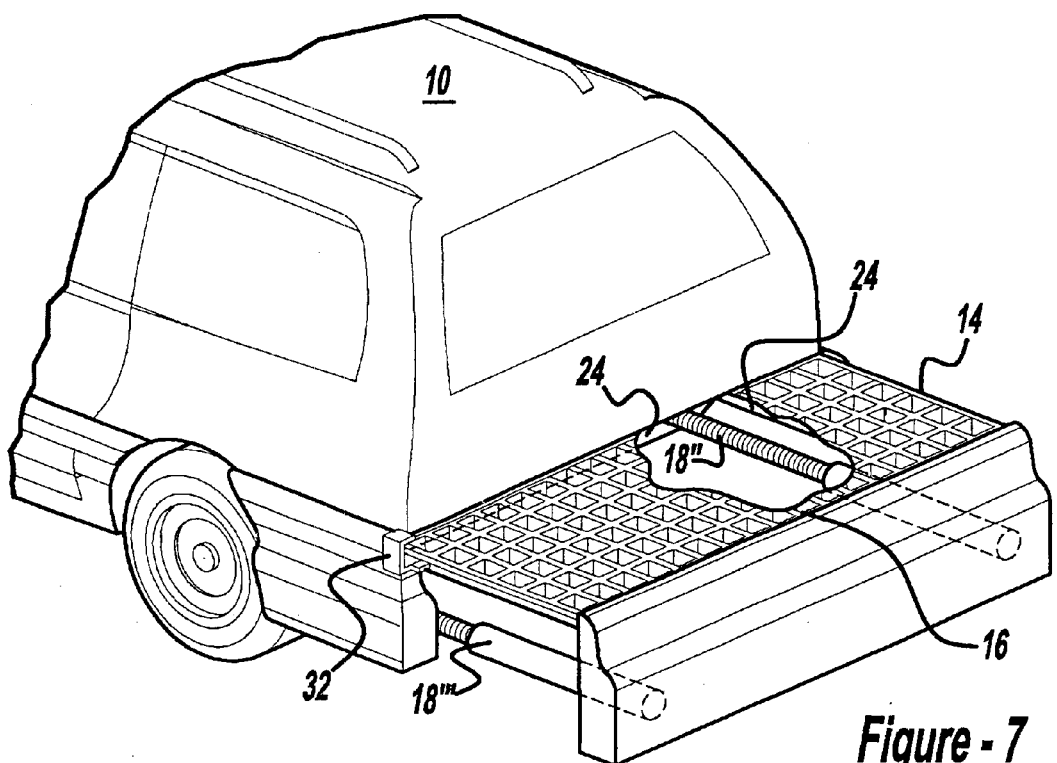
FIG. 7 illustrates a partial plan view of the vehicle frame support for the extendable vehicle bumper of the present invention with the platform in a fully opened position with screw extending support arms.
Figure 8:
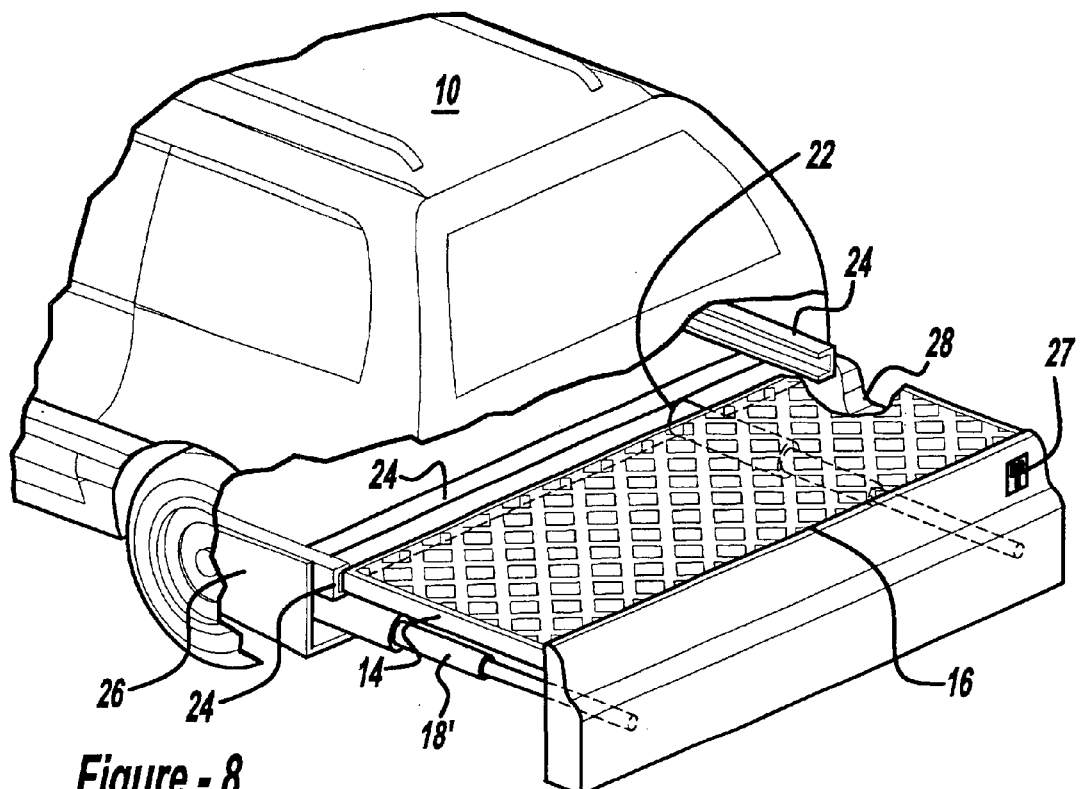
FIG. 8 illustrates a partial plan view with a cutaway section of the vehicle frame support for the extendable vehicle bumper of the present invention having a pan enclosure and the platform in an open position.

FIG. 1 illustrates an automotive vehicle 10 having an extendable vehicle bumper 12 of the present invention in a fully closed position. FIG. 2 illustrates the extendable vehicle bumper 12 in a partially opened position. A horizontal platform 14 is mounted to the underside of the vehicle 10 and is fixedly attached at one end 16 to the vehicle bumper 12. The horizontal platform 14 is shown extending between an open position (FIGS. 2–8) and a closed position (FIG. 1.) The platform 14 is extended by support arms 18 fixed to the vehicle bumper 12 at one end 20 and fixed to the vehicle frame 24 at the opposite end 22 (FIGS. 7 and 8.) In the closed position, the platform 14 is supported in a horizontal plane within the vehicle framework 24 on the underside of the rear end of the vehicle 10 (FIGS. 7 and 8.) Alternatively, the platform 14, support arms 18 and portions of the vehicle frame 24 may be enclosed in a pan-like structure 26 (FIG. 8) to provide additional environmental protection to the mechanical and electrical parts forming the horizontal platform 14.

Figure 4A:
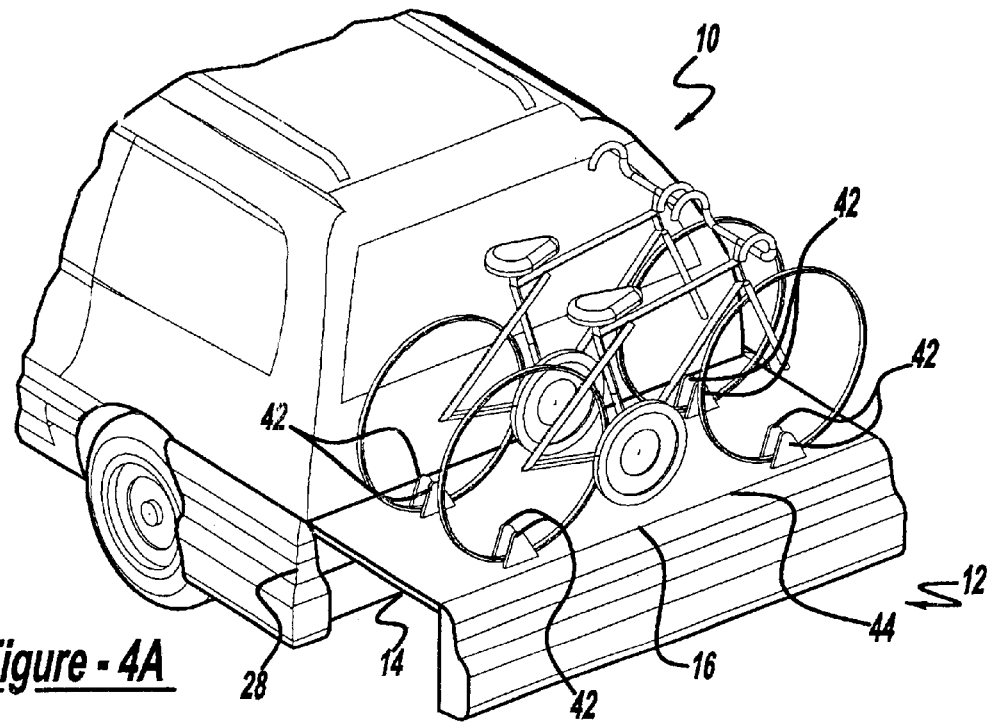
FIGS. 4A–C illustrate a partial plan view of the extendable vehicle bumper of the present invention in a fully opened position with folding side walls and supporting various objects on a horizontal platform.

The vehicle bumper 12 serves to access the platform 14 by providing a handle for extending the platform 14 outwardly from the vehicle frame 24. When the platform 14 is in the fully open position, as shown in FIGS. 3–8, the platform 14 extends beyond the vehicle profile 28 and is generally in rigid relation with the vehicle, thereby providing storage for any number of objects, such as a bicycle, goods having an unattractive odor or some other item whose transport on the exterior of a vehicle cabin is desired. Alternatively, the platform 14 may be used as a workbench when the vehicle 10 is parked as shown in FIG. 4C. Accessories such as a cooler, portable/mobile coffee service or coffee tray with coffee pot holder, for example, may be provided as interchangeable tray tables. Additionally, the location of the extendable vehicle bumper platform is amendable to use as a table surface for supporting objects including electrical objects that may easily connect to an exterior electrical outlet 27 provided with the extendable bumper or near a vehicle trailer hitch or socket.

With reference to FIGS. 2–8, the horizontal platform 14 is extendable between the open and closed position by support arms 18 fixed to the vehicle bumper 12 at one end 20. At the opposite end 22, the support arms 18 are preferably attached to the vehicle frame 24 a parallel horizontal plane to the platform 14. As best shown in FIGS. 7 and 8, the vehicle bumper 12, the platform 14 and the support arms 18 lay within parallel spaced horizontal planes and are generally mounted to the vehicle frame 24. The platform 14 may be fully or partially extended. In the any position, the platform 14 is generally in rigid relation with the vehicle 10 and may be locked in any position with a suitable locking mechanism 32. As such, the platform 14 may be used in an open position, partial (FIG. 2) or fully (FIGS. 3–8,) during transportation, or alternatively, as a workbench area (FIG. 4C) when the vehicle 10 is parked. With reference to FIGS. 4A–C, if the vehicle user wishes to transport undesirable materials 34 or odd shaped objects 36 unable to fit within the vehicle 10, the platform 14 may be extended for use to transport such objects. Additionally, the platform 14 may include a table surface 38 that can be used, for example, as a workbench for construction when the vehicle 10 is parked.

Figure 4B:
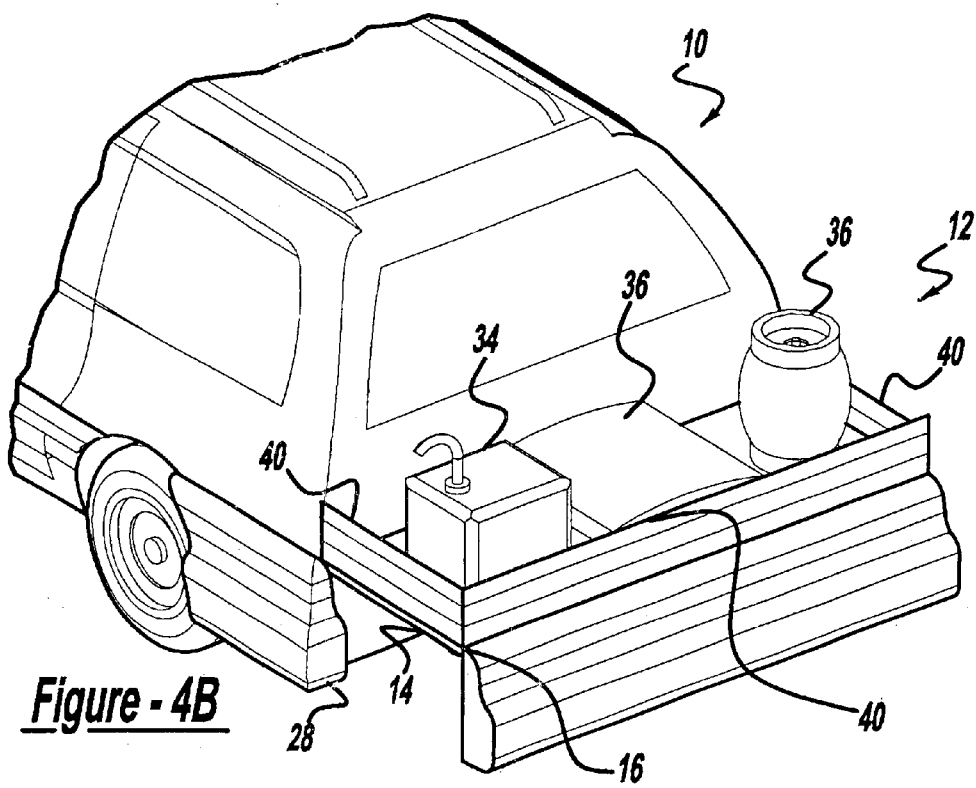
Figure 4C:
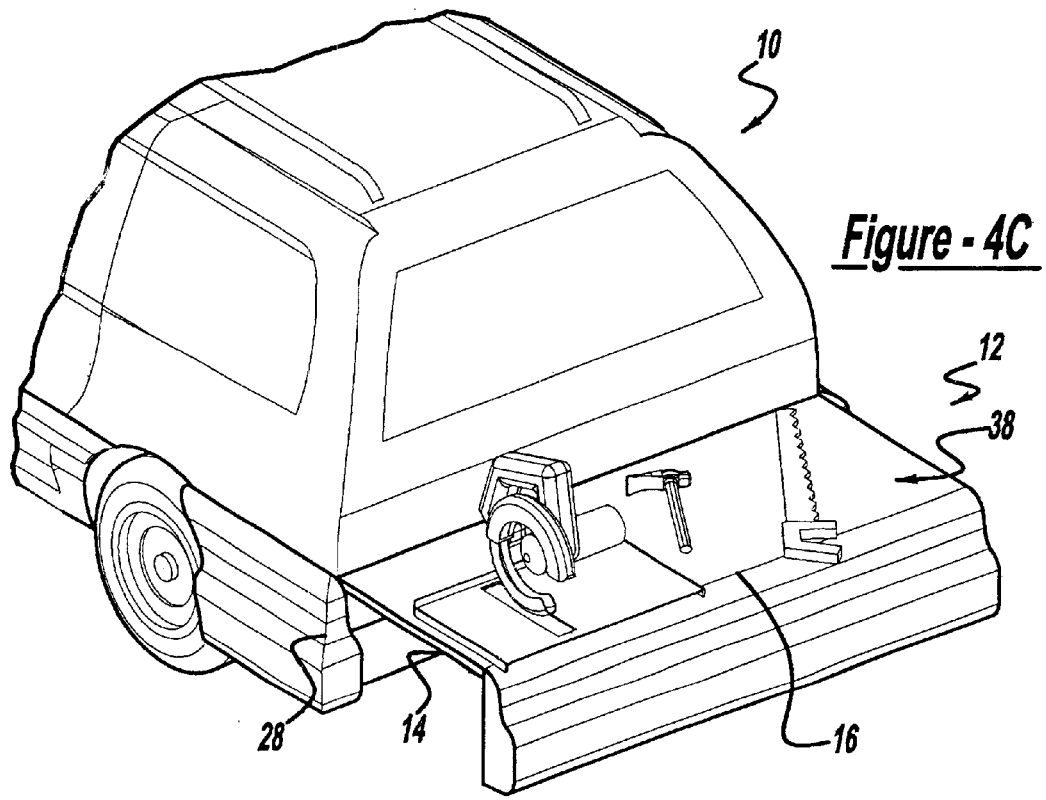
Figure 5:
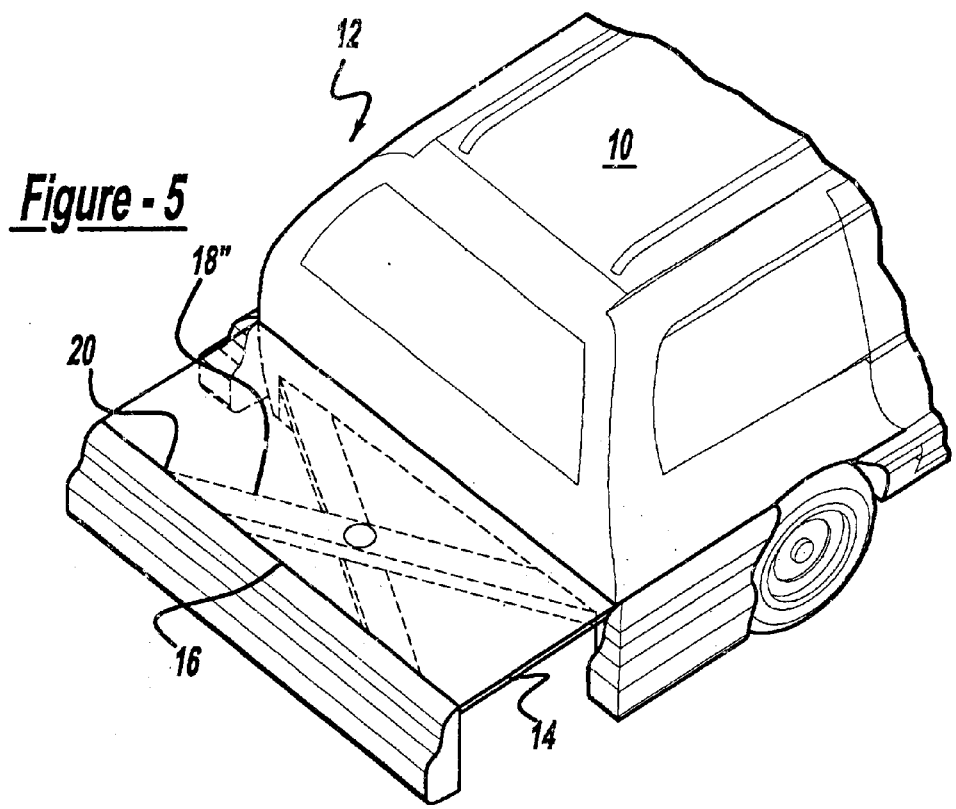
FIG. 5 illustrates a partial plan view of the extendable vehicle bumper of the present invention in a fully opened position with hinged support arms.

The platform 14 may also be formed with folding side walls 40 extendable between an upright position, as illustrated in FIG. 4B, when the platform 14 is in an open position and a collapsed position when the platform 14 is in a closed position. The side walls 40 are preferably formed of the same material as the platform 14 and may be locked in an open or unfolded position, thereby providing additional support when needed. In a preferred embodiment, the side walls 40 collapse toward the center of the platform 14 and lay flat upon themselves and the platform 14 when not in use. Similarly, the platform 14 may also include folding braces 42 for supporting an object such as a bicycle in an upright position, as shown in FIG. 4A. These braces 42 are preferably located in a folded form on the platform 14 or along the platform perimeter 44 and may be unfolded and locked upright when the platform 14 is in an open position.

The platform 14 is preferably formed of an environmentally protected material such as a steel mesh platform having a scratch-resistant black powder-coat finish, or formed of a rigid thermoplastic or thermoset material, such as one that is molded into a grated form. Alternative platform formations include a corrugated coated metal or plastic, a roll top platform guided by the vehicle frame mounting or any other materials that will provide a generally rigid relationship with the vehicle when the platform is in use.

The platform support arms may be formed as telescoping rods 18' for extending the platform between an open and closed position. The rods may be tubular, square or round, for example (FIGS. 6 and 8). Alternatively, the support arms may be scissors or hinge type 18" (FIG. 5) or an extendable screw drive 18''' (FIG. 7) or any formation that will provide a generally rigid relationship with the platform and the vehicle when the platform is in either position. The support arms and platform may be extended electrically or manually and are preferably locked into position to aid in maintaining rigidity and stability with the vehicle. The support arms, like the platform, are preferably formed of an environmentally protected material. Though the platform defining the extendable bumper may be thinner, it is preferably configured so that the platform range in section profile thickness averages from about 0.01" to about 1.5", and more preferably about 0.2" to about 1" (e.g. on the order of about 0.5".) The overall length and width of the platform is preferably configured to extend the available area under the tail end of the vehicle within the vehicle frame so that the platform range area averages on the order of about 60"×20". The load capacity of the platform ranges from about 150 lbs. to more preferably 500 lbs.

The bumper 12 preferably meets performance requirements for bumpers of original equipment vehicles. The bumper is preferably formed, for example, to function when the platform is in any position and more particularly when the platform is in an extended or open position.

The present invention may be provided as original equipment or available as an after market purchase. In either case, the platform and its support are formed to fit within the vehicle framework.

It should be understood that the invention is not limited to the exact embodiment or construction that has been illustrated and described but that various changes may be made without departing from the spirit and the scope of the invention.

What is claimed is:

1. An extendable vehicle bumper for external transportation and storage comprising:

a horizontal platform mounted to the underside of the rear end of a vehicle and fixedly attached at one end to said vehicle bumper, wherein said platform is slidable between an open and closed position in a horizontal plane and wherein said platform and said vehicle bumper lay within parallel spaced horizontal planes and said platform is in generally rigid relation with the vehicle in said open and closed positions; and extendable support arms fixedly attached to said vehicle bumper for extending said platform between said open and closed positions;

wherein said platform is formed of weather-resistant material, wherein said vehicle bumper provides a handle for sliding said platform between said open and closed positions.

2. The extendable vehicle bumper as defined in claim 1, wherein said vehicle bumper meets performance requirements for bumpers of original equipment vehicles when said platform is in said open position.

3. The extendable vehicle bumper as defined in claim 1, wherein said platform further comprises folding side walls extendable between an upright position when said platform is in said open position and a collapsed position when said platform is in said closed position.

4. The extendable vehicle bumper as defined in claim 1, wherein said platform further comprises braces for supporting a bicycle when said platform is in said open position.

5. The extendable vehicle bumper as defined in claim 1, wherein said platform is partially extendable between said open and said closed positions.

6. The extendable vehicle bumper as defined in claim 5, wherein said platform and said vehicle are disposed in generally rigid relation when said platform is in said partially extendable position.

7. The extendable vehicle bumper as defined in claim 1, wherein said platform further comprises a removable and replaceable tray table.

8. The extendable vehicle bumper as defined in claim 1, wherein said vehicle bumper further comprises an electrical outlet.

9. An extendable vehicle bumper for external transportation and storage comprising:

a platform fixedly attached to said vehicle bumper and horizontally extendable between an open and closed position;

an enclosure surrounding said platform and providing environmental protection, said enclosure and said platform mounted to and supported by a vehicle frame; and extendable support arms fixedly attached to said bumper at one end and to a vehicle frame at the opposite end, said support arms extending said platform between said open and closed positions;

wherein said vehicle bumper is fixedly attached to said platform, opposite said support arms and meets performance requirements for a vehicle bumper of original equipment vehicles when said platform is in said open position.

10. The extendable vehicle bumper as defined in claim 9, wherein said platform is formed of weather-resistant material.

11. The extendable vehicle bumper as defined in claim 9, wherein said platform further comprises folding side walls extendable between an upright position when said platform is in said open position and a collapsed position when said platform is in said closed position.

12. The extendable vehicle bumper as defined in claim 9, wherein said platform further comprises braces for supporting a bicycle when said platform is in said open position.

13. The extendable vehicle bumper as defined in claim 9, wherein said platform is partially extendable between said open and said closed positions.

14. The extendable vehicle bumper as defined in claim 13, wherein said platform and a vehicle are disposed in generally rigid relation when said platform is in said partially extendable position.

15. The extendable vehicle bumper as defined in claim 9, wherein said platform and a vehicle are disposed in generally rigid relation when said platform is in said open position.

16. The extendable vehicle bumper as defined in claim 9, wherein said platform further comprises a removable and replaceable tray table.

17. The extendable vehicle bumper as defined in claim 9, wherein said vehicle bumper further comprises an electrical outlet.

18. An extendable vehicle bumper for external transportation and storage comprising:

a platform mounted to the underside of a vehicle frame and fixedly attached at one end to said vehicle bumper; said platform extendable along a horizontal plane between an open and closed position, wherein said platform in said open position extends beyond the vehicle profile and is generally in rigid relation with the vehicle for providing external storage space; and extendable support arms fixedly attached to said vehicle bumper at one end and to the vehicle frame at its opposite end, said support arms extending said platform between said open and closed positions;

wherein said platform is partially extendable between said open and said closed position and is generally in rigid relation with the vehicle for providing external storage space when partially extended;

wherein said extended vehicle bumper includes an enclosure formed of weather-resistant material and surrounding said platform and said support arms for providing environmental protection, said enclosure and said platform mounted to and supported by a vehicle frame, and wherein said extended vehicle bumper includes a locking mechanism for securing said platform in place when said platform is in said open, partially extended or closed positions.

19. The extendable bumper as defined in claim 18, wherein said platform is formed of weather-resistant material.

20. The extendable bumper as defined in claim 18, wherein said platform further comprises folding side walls extendable between an upright position when said platform is in said open position and a collapsed position when said platform is in said closed position.

* * * * *